(12) United States Patent
Hurst et al.

(10) Patent No.: US 11,803,561 B1
(45) Date of Patent: Oct. 31, 2023

(54) APPROXIMATION QUERY

(71) Applicant: Amazon Technologies, Inc., Reno, NV (US)

(72) Inventors: William Nathan John Hurst, Seattle, WA (US); Timothy Daniel Cole, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 234 days.

(21) Appl. No.: 14/231,597

(22) Filed: Mar. 31, 2014

(51) Int. Cl.
*G06F 16/2458* (2019.01)
*G06F 16/31* (2019.01)

(52) U.S. Cl.
CPC .............. *G06F 16/2462* (2019.01); *G06F 16/313* (2019.01)

(58) Field of Classification Search
CPC ......... G06F 17/30864; G06F 17/30867; G06F 17/30616; G06F 17/3001; G06Q 30/021; G06F 17/30536; G06F 15/18; G06F 16/2462; G06F 16/313
USPC ......................................... 707/708, 706, 730
See application file for complete search history.

(56) References Cited

U.S. PATENT DOCUMENTS

| | | | | |
|---|---|---|---|---|
| 5,826,261 | A * | 10/1998 | Spencer | G06F 17/30616 |
| 5,903,892 | A * | 5/1999 | Hoffert et al. | G06F 17/30017 |
| 5,983,176 | A * | 11/1999 | Hoffert et al. | G06F 17/30743 704/231 |
| 6,665,661 | B1* | 12/2003 | Crow et al. | G06F 17/30616 |
| 6,772,170 | B2* | 8/2004 | Pennock et al. | G06F 17/3061 |
| 7,345,232 | B2* | 3/2008 | Toivonen et al. | G10H 1/0058 709/203 |
| 7,765,178 | B1* | 7/2010 | Roizen et al. | G06F 17/30687 |
| 7,779,040 | B2* | 8/2010 | Hicks | G06Q 30/02 707/795 |
| 7,873,640 | B2* | 1/2011 | Chang et al. | G06F 17/2785 705/14.1 |
| 8,103,661 | B2* | 1/2012 | Patman Maguire | G06F 17/30401 707/722 |
| 8,135,728 | B2* | 3/2012 | Yih et al. | G06F 17/241 707/705 |
| 8,145,648 | B2* | 3/2012 | Kunjithapatham et al. | G06F 17/30781 707/738 |
| 8,245,135 | B2* | 8/2012 | Cai et al. | G06F 17/30884 707/708 |
| 8,380,718 | B2* | 2/2013 | Gallivan et al. | G06F 3/0641 707/738 |
| 8,589,399 | B1* | 11/2013 | Lee et al. | G06F 17/30616 707/737 |
| 8,631,027 | B2* | 1/2014 | Patterson | G06F 16/313 707/759 |
| 8,725,717 | B2* | 5/2014 | Bernstein et al. | G06Q 10/107 707/708 |

(Continued)

OTHER PUBLICATIONS

Arther Delcher; Nuclei Acids Research 2002; Vol. 30, No. 11; Pgs. 1-6 (Year: 2002).*

*Primary Examiner* — Albert M Pillips, III
*Assistant Examiner* — Jeramine A Mincey
(74) *Attorney, Agent, or Firm* — Davis Wright Tremaine LLP

(57) ABSTRACT

Documents may be maintained in a repository and retrieved based on searches that specify labels as criteria. Documents may be associated with groups of labels identified as topics. Searches may be performed using binary-encoded matrices specifying relationships between documents and topics, topics and labels and differential information indicating differences between topics and labels associated with documents. An initial result estimate may be based on forming a product of a documents-topics matrix and a topics-labels matrix. The initial estimate may be corrected by applying the differential information.

20 Claims, 8 Drawing Sheets

(56) References Cited

U.S. PATENT DOCUMENTS

| | | | | |
|---|---|---|---|---|
| 8,782,042 | B1* | 7/2014 | Cooke et al. | G06F 17/30572 707/729 |
| 9,268,843 | B2* | 2/2016 | Pradhan et al. | G06Q 30/0269 |
| 2002/0022956 | A1* | 2/2002 | Ukrainczyk et al. | G06F 40/20 704/9 |
| 2003/0037073 | A1* | 2/2003 | Tokuda et al. | G06F 17/271 715/234 |
| 2004/0088308 | A1* | 5/2004 | Bailey et al. | G06F 17/3071 |
| 2008/0086453 | A1* | 4/2008 | Fabian | G06F 16/334 |
| 2009/0248678 | A1* | 10/2009 | Okamoto et al. | G06F 17/3071 |
| 2010/0057694 | A1* | 3/2010 | Kunjithapatham et al. | G06F 17/30781 707/E17.009 |
| 2010/0161663 | A1* | 6/2010 | Patman Maguire | G06F 17/30401 707/780 |
| 2010/0262454 | A1* | 10/2010 | Sommer et al. | G06Q 30/02 706/20 |
| 2011/0078159 | A1* | 3/2011 | Li et al. | G06F 17/3028 707/749 |
| 2011/0270874 | A1* | 11/2011 | Aley | G06F 17/30637 707/769 |
| 2012/0259831 | A1* | 10/2012 | Wang et al. | G06F 17/30867 707/708 |
| 2012/0330958 | A1* | 12/2012 | Xu et al. | G06F 17/16 707/738 |
| 2013/0144874 | A1* | 6/2013 | Koperda et al. | G06F 17/3053 707/730 |
| 2013/0268544 | A1* | 10/2013 | Nikankin | G06F 17/30616 707/754 |
| 2014/0040258 | A1* | 2/2014 | Schwartz et al. | G06F 17/30058 707/736 |
| 2015/0227624 | A1* | 8/2015 | Busch et al. | G06F 16/951 707/728 |

* cited by examiner

APPROXIMATION QUERY

BACKGROUND

Various forms of documents, such as photographs and web pages, may be categorized through various means, such as user-identified categorization, application of statistical techniques and so on. A categorization process may involve associating descriptive labels with documents and storing those associations in a repository with the documents. Clients may access the repository by sending search requests to a document repository. The request may specify a set of labels as criteria for the search. The document repository may respond to the request by traversing various tables and index structures while looking for documents possessing the specified set of labels. The tables and indexes used to locate the relevant documents may be bound to database management systems and storage devices that may be components of a document repository. Accordingly, search performance may be bound by the performance of these systems. In addition, this technique may not be compatible with remotely performed searches of a document repository.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
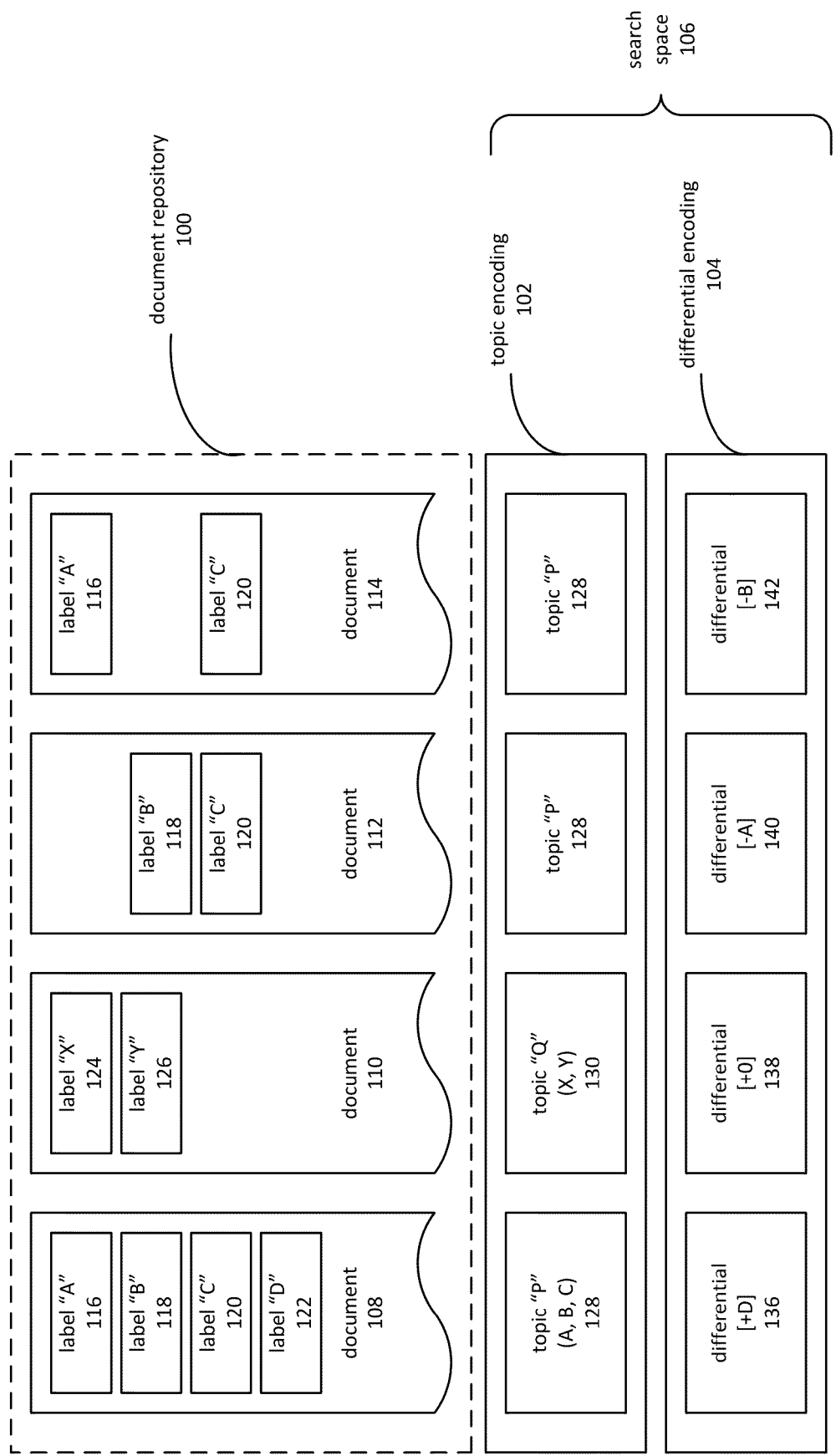
FIG. 1 is a block diagram depicting an embodiment of a system for encoding document label information as topics and differentials.

A collection of documents may be maintained on one or more computing nodes hosted by a provider remote to various clients. Searching functions may be applied to the document using various labels that describe the documents. A photograph of a dog might, for example, be tagged with labels such as "dogs," "shepherds," "canine" and so forth. Clients of the provider may wish to locate and retrieve various documents by searching based on these labels. Embodiments of the present disclosure may be utilized to perform searches and other functions within an encoded representation of a corpus of documents and associated labels.

As used herein, the term "documents" may refer to any of various types of files maintained on a computing system, such as photographs, word processing documents, text files, web pages and so on. A document repository may be employed in conjunction with embodiments of the present disclosure. A document repository may comprise one or more computing nodes on which systems such as a database management system, file system or other data store maintain collections of documents, photographs or other types of files or records.

A document may be associated with various labels that may be indicative of the content, purpose or other aspect of the document. As used herein, the term "label" may refer to any of various types of tags, category codes, identification codes and other identifiers. In some embodiments, labels may comprise alphanumeric strings. In other embodiments, a topic may comprise a numeric, binary or other type of value. A document may be associated with or assigned a set of labels that describe the contents of the documents. In some embodiments, however, the labels may be unrelated to the contents of the document.

As used herein, the term "topic" may refer to a grouping of one or more labels. A topic may, in some embodiments, be associated with an identifier, such as an alphanumeric identifier. For example, the identifier "pets" might refer to a topic comprising the labels "dogs" and "cats." The term "topic" may be used herein to refer to either a grouping of labels or to a corresponding identifier of the grouping. A topic may refer to various labels having a semantic relationship, such as labels sharing a common category.

Embodiments of the present disclosure may encode associations between documents and topics in a matrix or other such structure. A matrix may refer to a data structure maintained in a memory or other storage device of a computing node. A matrix may comprise two or more dimensions and a plurality of elements positioned at the intersections of the dimensions. It will be appreciated, however, that various alternative structures may be employed in addition to or instead of matrix structures.

Embodiments of the present disclosure may employ differentials between topics associated with a document and a set of labels associated with a document. A topic associated with a document may be treated by various embodiments as an approximation of a set of labels associated with a document. Differentials may be encoded within a matrix comprising a document dimension and a topic differential dimension.

Embodiments may perform searches of a document repository using the aforementioned encoded representations. Some embodiments may perform searches within the encoded space without directly involving the document repository. An embodiment may, for example, perform searches of a remote document repository on a storage device.

FIG. 1 depicts an example of an embodiment in which a document repository 100 is encoded based on topics and differentials. A document repository 100 may contain various documents, such as documents 108, 110, 112 and 114. Each document may be associated with various labels. For example, document 108 is associated with label "A" 116, label "B" 118, label "C" 120 and label "D" 122. Other documents may be associated with the same set of labels or a subset thereof, as is the case in FIG. 1 with documents 112 and 114. Other documents may be associated with other labels, such as document 110, which is depicted as being associated with label "X" 124 and label "Y" 126.

Embodiments may associate topics with various combinations of labels. For example, FIG. 1 depicts topic "P" 128 being defined as including label "A" 116, label "B" 118 and label "C" 120. Similarly, FIG. 1 depicts topic "Q" 130 as including label "X" 124 and label "Y" 126.

Associating topics with labels may comprise two stages, which may be performed in various orders by different embodiments. One such stage involves forming topics, while another stage involves associating sets of labels with the various topics. In some embodiments, topics may be defined first, while in others, groups of labels are first identified and then assigned to topics.

Embodiments may incorporate various factors and analysis techniques to identify topics and associate topics with groups of labels. Embodiments may employ various statistical methods to analyze documents maintained by document repository 100. In various embodiments, labels may be extracted or formed from documents in document repository 100. Topics may be associated with labels based on the frequency with which labels are associated with documents. Embodiments may analyze the frequency of occurrence for a cluster of labels. For example, in FIG. 1 topic "P" 128 could be defined as including label "A" 116, label "B" 118 and label "C" 120, based on the relative frequency with which this combination wholly or partially appears in documents maintained in document repository 100. Embodiments may perform minimization or maximization analysis on various associations of labels and topics, so that a given topic may represent a maximized number of documents, while the number of labels associated with a topic is minimized.

Various embodiments may employ various types of semantic analysis on labels to define possible topics and/or to associate sets of labels with topics. For example, various topics may be defined, such as people, places, events and so on. Embodiments may associate labels with topics based on semantic relationships.

Some embodiments may exclude various labels from association with tags. For example, in various cases and embodiments certain labels may occur with very high frequency across a variety of semantically dissimilar topics. Accordingly, labels that occur with frequency above a threshold value may be disqualified for grouping with various labels. Embodiments may also perform semantic analysis to locate potential candidates for disqualification.

A topic encoding 102 may comprise a vector or matrix indicating association between documents and topics. As depicted by the example of FIG. 1, a topic encoding 102 may associate documents 108, 112, and 114 with topic "P" 128. Document 110 may be associated with topic "Q" 130.

A differential encoding 104 may comprise information indicating differences between a topic associated with a document and a set of labels associated with that document. For example, document 108 may be associated with topic "P" 128 and differential 136, which is depicted in FIG. 1 as [+D]. By applying this differential to the topics specified by topic "P" 128, embodiments may form a reconstruction of the set of topics associated with document 108. Similarly, embodiments may apply differentials 140 and 142 to topic "P" 128 to arrive at the labels associated with documents 112 and 114. Embodiments may employ both additive and subtractive encodings. An encoding may indicate that a document has tags equivalent to those associated with a topic, such as differential 138. Embodiments may explicitly or implicitly encode such differentials. Implicit encoding of this type of differential may be done, in various embodiments, by an absence of an entry in a sparse matrix, by a zero value or a null value.

Embodiments may conduct searches for documents within search space 106, which comprises topic encoding 102 and differential encoding 104. An encoding of relationships between topics and labels may also be included within search space 106. Embodiments may perform searches using these encodings, without referring to the collection of labels or the documents themselves.

Figure 2:
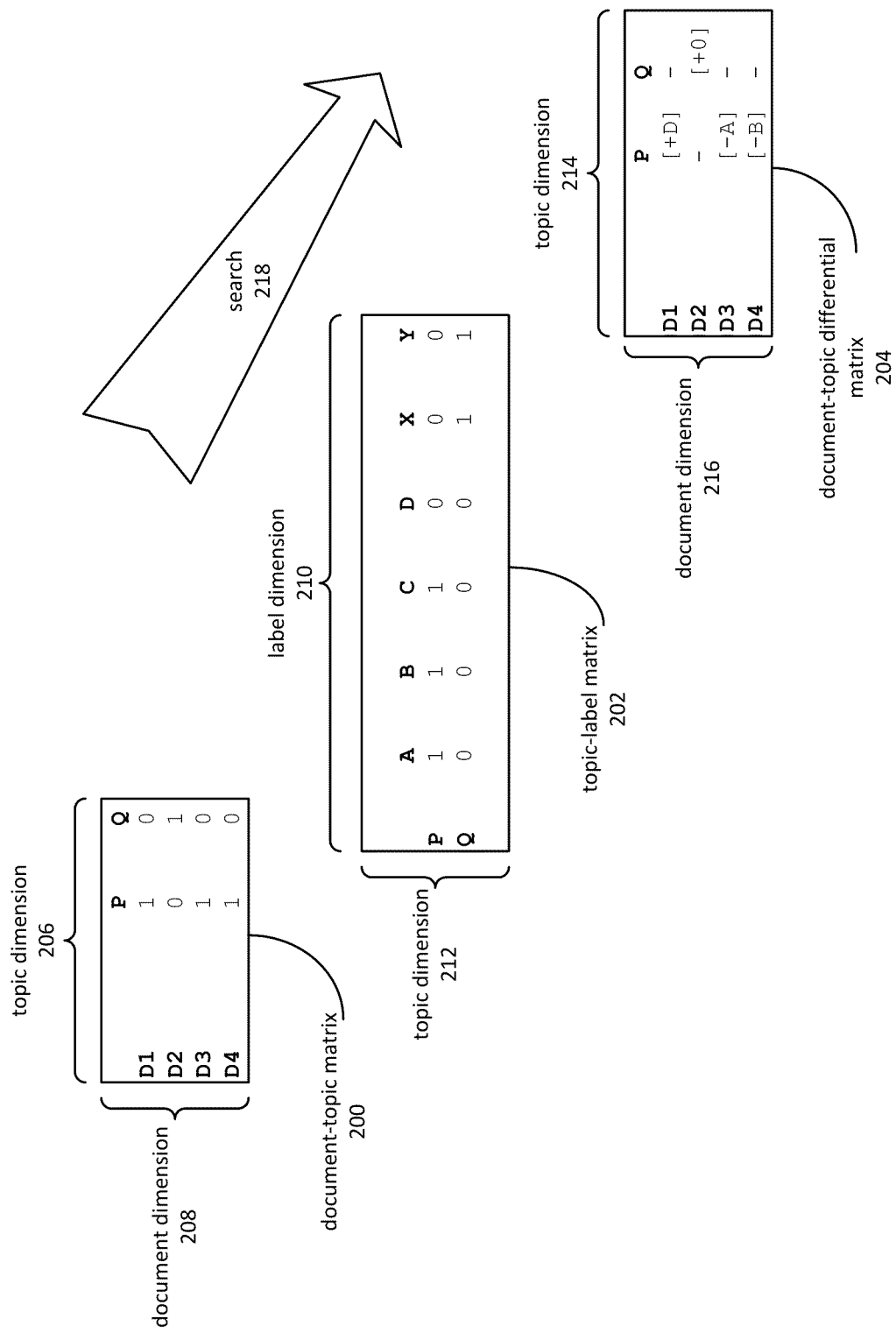
FIG. 2 is a block diagram depicting an embodiment of a process for performing document searches in a search space encoded as a document-topic matrix, a topic-label matrix and a document-topic differential matrix.

FIG. 2 depicts an example of an embodiment for performing searches using encodings of topics, labels and differentials. A search 218 may be performed using topic, label and differential matrices. These may include sparse matrices 200, 202 and 204. A matrix may refer to various layouts and data structures maintained in a non-transitory computer-readable storage medium, such as random-access memory, a disk drive or a solid-state storage device. A matrix may comprise two or more dimensions and contain elements at intersections of the dimensions of the matrix. Embodiments may employ a sparse matrix structured to efficiently store data where a number of points of the matrix contain no data. A sparse matrix may comprise a wide variety of structures for storing data in a computer memory in a manner that is efficient, when compared to non-sparse structures, in the case where comparatively few entries in the matrix are populated.

Although FIG. 2 depicts an example of performing a search using matrix-based encodings, various other encodings or representations may be used in conjunction with aspects of the present disclosure. For example, aspects of the present disclosure may be practiced using database tables joined by execution of a database query.

A document-topic matrix 200 may comprise a document dimension 208 and a topic dimension 206. The document dimension 208 may represent some or all documents contained in a document repository. The topic dimension 206 may contain some or all topics. An element at an intersection of document dimension 208 and topic dimension 206 may be a binary value indicating that the corresponding document and topic are associated, or in other words indicating that the document has been assigned to the topic. Use of binary values and sparse matrix structures may allow document-topic matrix 200 to be space-efficient.

A topic-label matrix 202 may comprise a topic dimension 212 and a label dimension 210. The topic dimension 212 may comprise labels assigned to documents in document-topic matrix 200. The label dimension 210 may comprise labels associated with topics in topic dimension 212. Elements at the intersection of a topic and label may be binary values indicating that the corresponding topic and label are associated, or in other words that the topic is inclusive of the label. A topic-label matrix 202 may be represented as a sparse matrix in order to improve space-efficiency.

A document-topic differential matrix 204 may comprise a document dimension 216 and a topic dimension 214. Elements of document-topic differential matrix 204 may contain information indicative of a differential between a topic and a set of labels associated with a particular document. For example, in FIG. 2, document-differential matrix 204 contains the entry [-A] at the intersection of document D3 and topic P. This may indicate that document D3 is associated with labels B and C, based on subtracting A from the labels A, B and C that are associated with topic P.

Entries in document-topic differential matrix 204 may be represented using a variety of techniques. Embodiments may, for example, employ an additional dimension corresponding to labels within a topic. The element at the intersection of D3 and P could, for example, be represented as values in the additional dimension of [-1, *, *], where "*" denotes an empty value in a sparse matrix representation and "-1" indicates that the label in the corresponding position (in this case label "A") may be removed from the topic to arrive at a set of labels associated with the corresponding document. Embodiments may, however, employ other techniques to represent differentials.

A search 218 may be employed using a document-topic matrix 200, a topic-label matrix 202 and a document-topic differential matrix 204. A search may be associated with a set of criteria, which may be indicative of one or more labels. A search of a document repository may be performed to retrieve documents possessing those labels.

A product of document-topic matrix 200, topic-label matrix 202, and a criteria matrix may be indicative of a set of documents in the repository that are associated with topics relevant to the search. In some embodiments, topic-label matrix 202 may be formed based in part on the search criteria to include topics and labels relevant to the search. Using these or similar techniques, the resulting product may be indicative of documents in the repository having topics associated with one or more labels specified as search criteria.

Elements of document-topic differential matrix 204 may be applied to the product of document-topic matrix 200 and topic-label matrix 202. Embodiments may use the result to determine which documents contain labels specified in the search criteria. Embodiments may apply the differential information contained in document-topic differential matrix 204 by matrix multiplication or by addition/subtraction, depending upon how the differential information is encoded. Various other techniques may also be employed. The technique or techniques employed may depend on how differential information is encoded. Based on applying the differential, documents having the set of labels indicated by the criteria may be included in a result set, and documents not having the indicated set of labels may be excluded.

Figure 3:
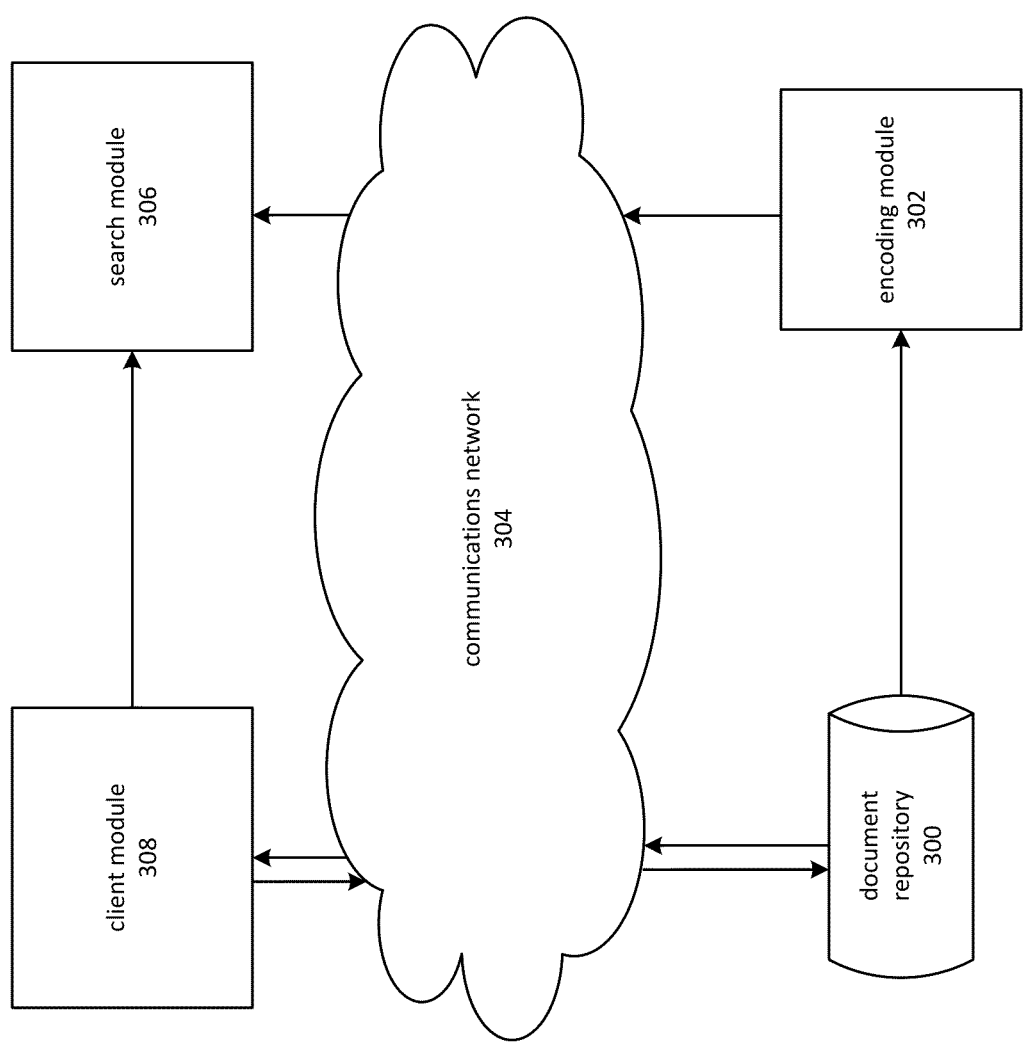
FIG. 3 is a block diagram of a system for label-based searching on a remote document store using a locally held encoding of topic and differential information.

FIG. 3 depicts an embodiment that transmits encodings as described herein to perform local searches of documents stored remotely. Documents may be maintained on one or more computing nodes maintaining a document repository 300. An encoding module 302 may form encodings of labels associated with documents stored in the document repository 300. As used herein, the term module may refer to various combinations of computer-readable instructions and circuitry, such as executable programs and libraries. Encodings may include, but are not limited to, document-topic matrices, topic-label matrices and document-topic differential matrices. Encodings may be transmitted over communications network 304 to a search module 306. A client module 308 may supply criteria to search module 306. Local searches may be performed by search module 306 using the transmitted encodings. Upon locating documents corresponding to criteria supplied by client module 308, embodiments may request and receive the located documents from document repository 300.

Figure 4:
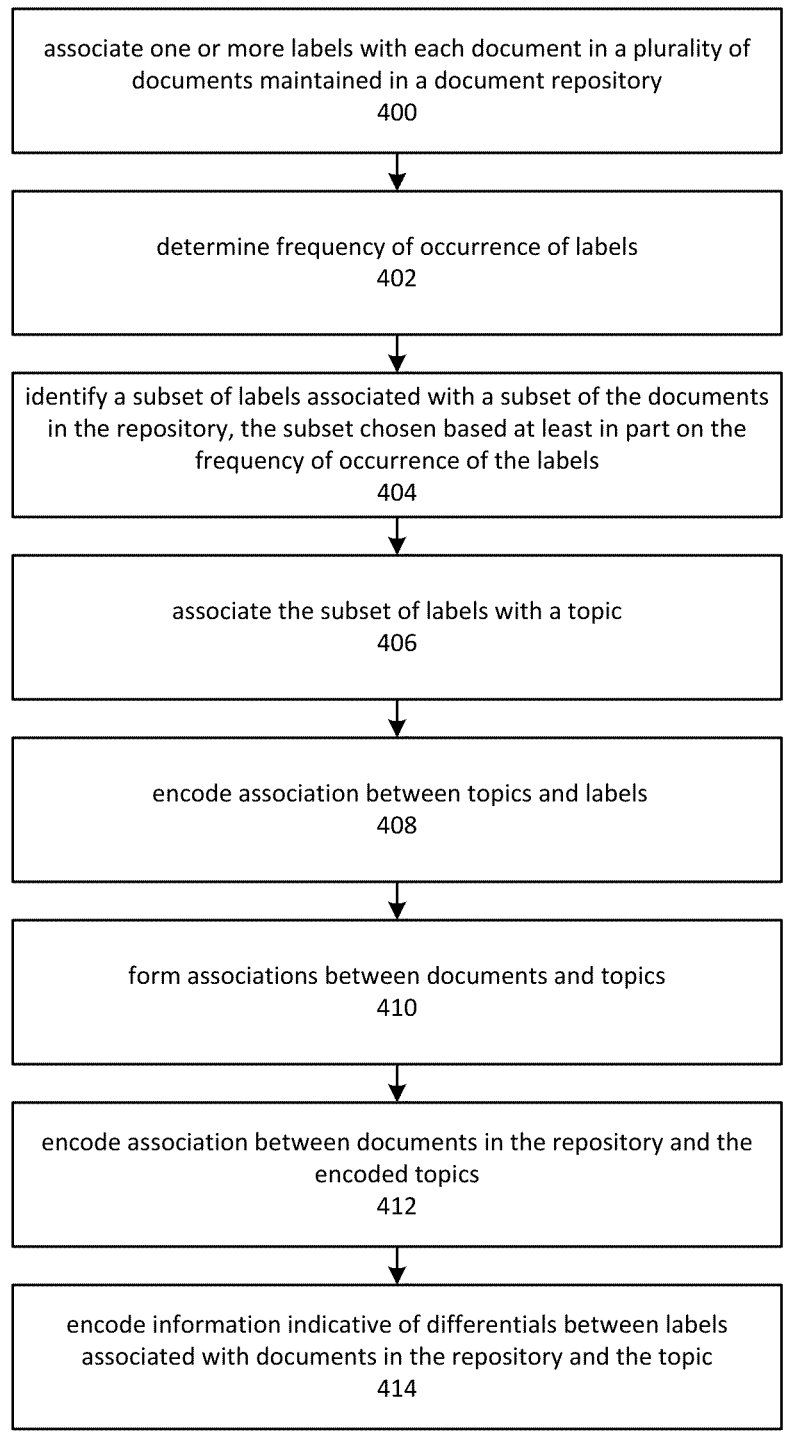
FIG. 4 is a flowchart depicting an embodiment of a process for encoding document label information as topics and differentials.

FIG. 4 depicts an embodiment of a process for encoding document, topic and differential information. Although depicted as a sequence of operations, those of ordinary skill in the art will appreciate that the depicted order should not be construed as limiting the scope of the present disclosure and that at least some of the depicted operations may be altered, omitted, reordered or performed in parallel.

Operation 400 depicts associating one or more labels with each document in a plurality of documents maintained in a document repository. Individual documents in a repository may each be associated with a potentially distinct set of labels, though typically a repository may contain documents having the same set of labels.

As depicted by operation 402, embodiments may determine the frequency with which various labels and/or combinations of labels occurs within the repository. Embodiments may identify a subset of labels based on the frequency and/or other forms of statistical analysis, as depicted by operation 404. The identified subset of labels may comprise labels commonly grouped together in various documents. For example, the labels "dogs," "cats," and "household pets" might frequently be associated with the same document, while the label "crocodile" might not be. Accordingly, an embodiment might identify a set of labels consisting of "dogs," "cats," and "household pets." In another case, the terms "dogs" and "household pets" might occur together with high frequency, as might the terms "cats" and "household pets." In this case, embodiments might select "dogs" and "household pets" as one set of labels, and "cats" and "household pets" as another.

Operation 406 depicts associating a subset of labels with a topic and encoding the association in a sparse matrix. A topic may be indicative of a semantic relationship between the topic and its associated labels. For example, the topic "pets" might be used to describe a set of labels including the terms "cats" and "dogs." In some embodiments, a topic may be an identifier of a grouping of labels otherwise devoid of (or indifferent to) a semantic relationship between the labels with which it is associated. Operation 408 depicts encoding the associations between sets of labels and topics in a sparse matrix, using various techniques, such as those described herein.

At operation 410, embodiments may form associations between documents and topics stored in a repository. Embodiments may base associations between topics and documents on various techniques. Embodiments may, for example, apply various techniques to minimize the size and/or number of differentials between documents and topics. Associating topics with documents may be performed, by some embodiments, using minimization/maximization techniques involving the number of topics, the size of the error (e.g., the differentials), the amount of memory space required and so on. Operation 412 depicts storing associations between documents and topics by encoding and storing the information in a structure, such as a sparse matrix.

Embodiment may determine differentials between topics and the labels associated with particular documents. Operation 414 depicts encoding these differentials. Embodiments may encode and store this information in a structure, such as a sparse matrix. Embodiments may maintain a sparse matrix in various forms of data structures stored in a non-transitory storage medium, such as a computer memory. Embodiments may allocate storage space for a sparse matrix in a manner that reduces or eliminates under-utilized or non-utilized storage space with respect to empty members of the matrix.

Figure 5:
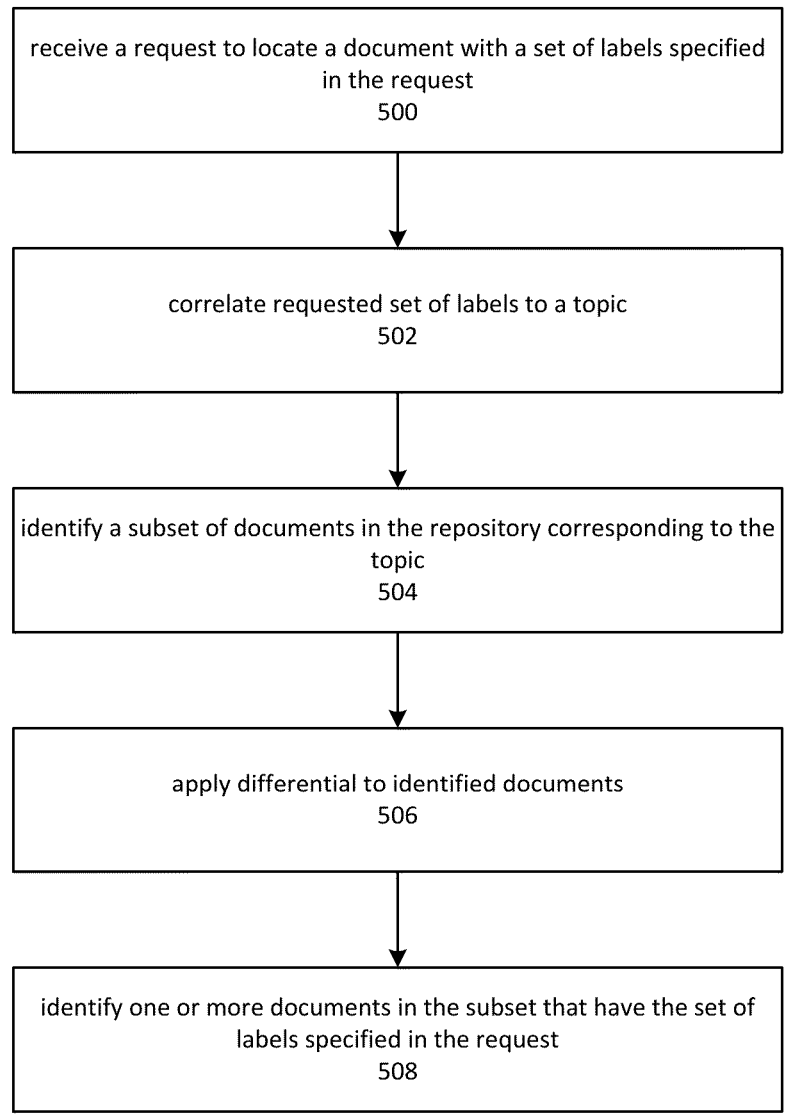
FIG. 5 is a flowchart depicting an embodiment of a process for document searching within an encoded search space.

FIG. 5 depicts an embodiment of a process for performing document searches using encoded document, topic and differential information. Although depicted as a sequence of operations, those of ordinary skill in the art will appreciate that the depicted order should not be construed as limiting the scope of the present disclosure and that at least some of the depicted operations may be altered, omitted, reordered or performed in parallel.

Operation 500 depicts receiving a request to locate a document that has a set of labels specified or otherwise indicated by the request. In response to the request, embodiments may perform one or more of the operations depicted in FIG. 5 as being subsequent to operation 500. Operation 502 depicts correlating the indicated set of labels to a topic. For example, a request might be for documents having the labels "dogs" and "cats." An embodiment might correlate these labels to topics, such as "pets" and "animals."

Operation 504 depicts identifying a subset of documents in the repository that correspond to the identified topics. The subset of documents that is selected based on the identified topics may be an initial estimate of the search results. In various embodiments, preliminary results of a search may be provided based on the initial estimate resulting from a search of the identified topics.

The initial estimate of the search results may be corrected based on applying differentials to the topics associated with the selected documents, thereby determining an error-corrected set of labels associated with each document. Operation 506 depicts applying differentials to the initially identified set of documents. Applying the differentials may correct errors of approximation caused by the use of topics.

Operation 508 depicts identifying one or more documents in the subset of documents that have the set of labels indicated in the request. In some cases and embodiments, this may comprise correcting errors of inclusion in which a document in the initial estimate does not contain a label specified in the request. In other cases and embodiments, this may comprise correcting errors of exclusion that may occur when the initial estimate does not include a document having a label specified in the request.

Figure 6:
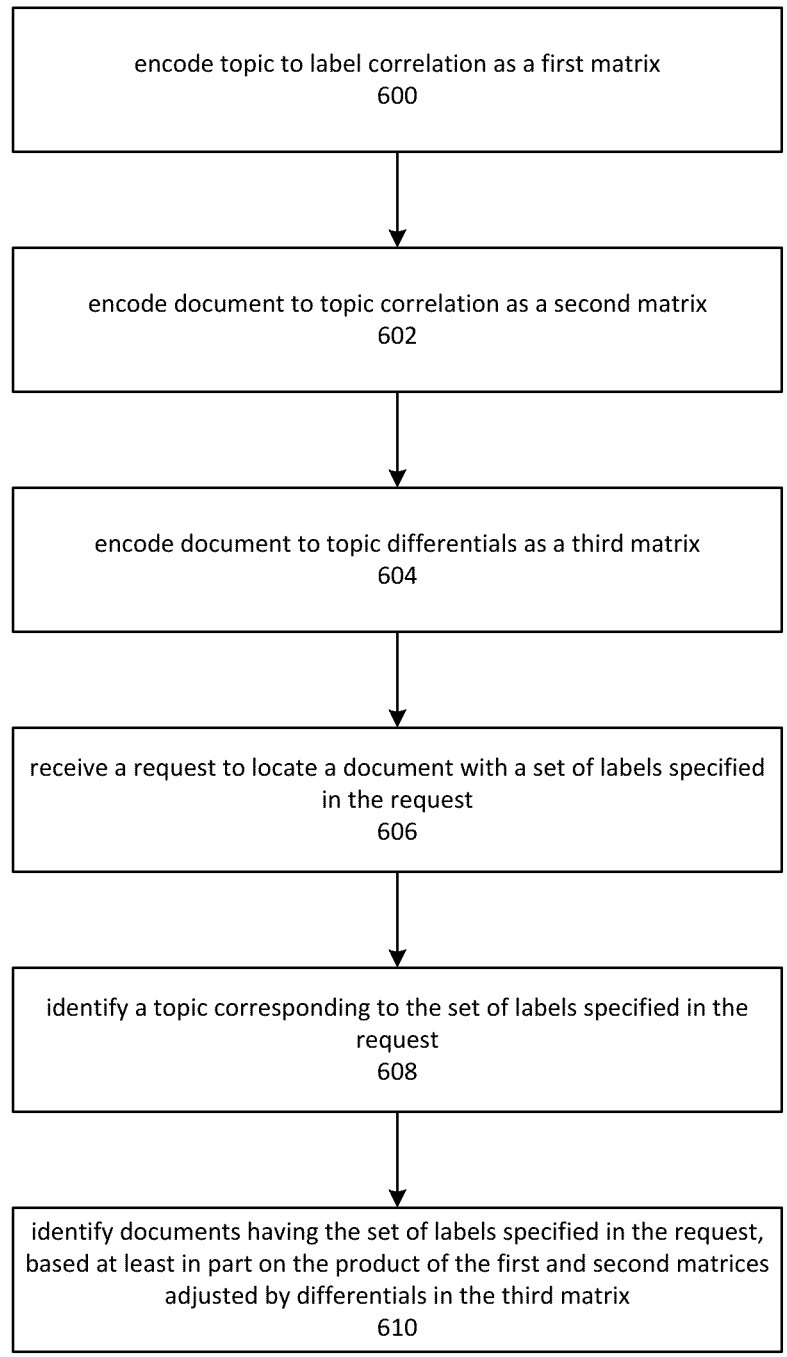
FIG. 6 is a flowchart depicting an embodiment of a process for document searching within an encoded search space, wherein the search space is represented by sparse matrices containing topic, label and differential information.

FIG. 6 depicts an embodiment of a process for performing a search using an encoded document, topic and differential information. Although depicted as a sequence of operations, those of ordinary skill in the art will appreciate that the depicted order should not be construed as limiting the scope of the present disclosure and that at least some of the depicted operations may be altered, omitted, reordered or performed in parallel.

Operation 600 depicts encoding a topic to label correlations as a first matrix. The first matrix may be structured as a sparse matrix with a topic dimension and a label dimension. Operation 602 depicts encoding a second matrix encoding document to topic correlations. The second matrix may be structured as a sparse matrix with a document dimension and a topic dimension. Operation 604 depicts encoding differential information in a third matrix comprising a document dimension and a topic dimension and containing elements comprising differential information. The third matrix may also be structured as a sparse matrix.

At operation 606, embodiments may receive a request to locate a document having a set of labels indicated by the request. The set of labels may correspond to one or more topics, which may be identified as depicted by operation 608. Identifying topics corresponding to the labels may involve correlating the labels specified in the request with a matrix containing a topic dimension and a label dimension.

Operation 610 depicts identifying documents having the set of labels indicated by the request, based at least in part on a product of the first and second matrices and adjusted based on the third matrix containing differential information. Forming a product of the first and second matrices may include forming a set of associations between documents and labels associated with document topics. Adjusting by the third matrix containing differential information may comprising adding or subtracting labels from the product and thereby forming a set of associations between the documents and an error-corrected set of labels associated with each document. In other words, identifying documents may be performed using a rough estimate based on topics and adjusted based on differentials.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates and administration. Some DBMSs provide for interaction with the database using query languages, such as structured query language ("SQL"), while others use APIs containing operations, such as put and get and so forth. Interaction with the database may also be based on various protocols or standards, such as hypertext markup language ("HTML") and extended markup language ("XML"). A DBMS may comprise various architectural components, such as a storage engine that acts to store data on one or more storage devices, such as solid-state drives.

Figure 7:
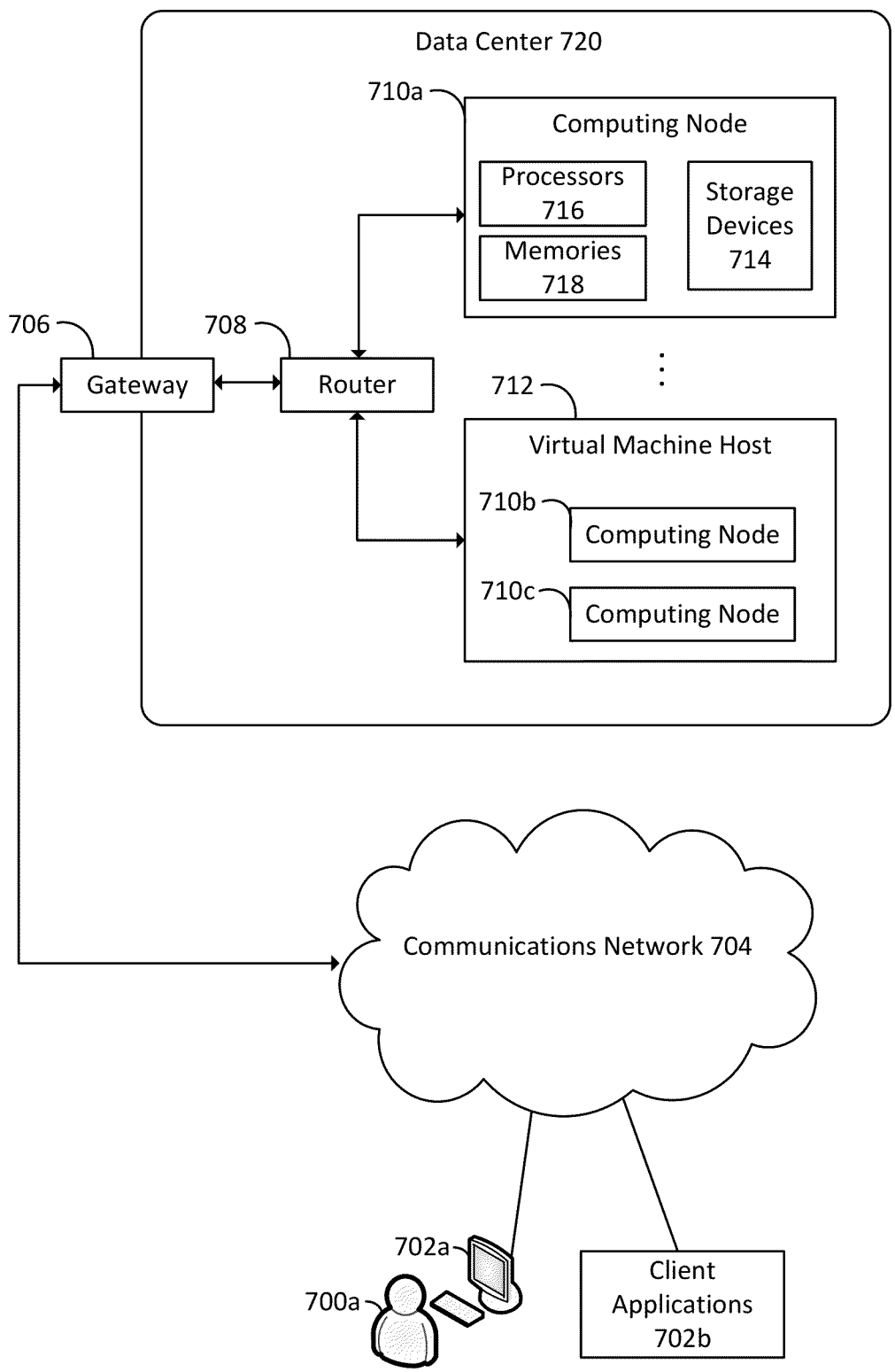
FIG. 7 is a block diagram depicting an embodiment of a computing environment in which aspects of the present disclosure may be practiced.

FIG. 7 is a diagram depicting an example of a distributed computing environment on which aspects of the present invention may be practiced. Various users 700a may interact with various client applications, operating on any type of computing device 702a, to communicate over communications network 704 with processes executing on various computing nodes 710a, 710b and 710c within a data center 720. Alternatively, client applications 702b may communicate without user intervention. Communications network 704 may comprise any combination of communications technology, including the Internet, wired and wireless local area networks, fiber optic networks, satellite communications and so forth. Any number of networking protocols may be employed.

Communication with processes executing on the computing nodes 710a, 710b and 710c, operating within data center 720, may be provided via gateway 706 and router 708. Numerous other network configurations may also be employed. Although not explicitly depicted in FIG. 7, various authentication mechanisms, web service layers, business objects or other intermediate layers may be provided to mediate communication with the processes executing on computing nodes 710a, 710b and 710c. Some of these intermediate layers may themselves comprise processes executing on one or more of the computing nodes. Computing nodes 710a, 710b and 710c, and processes executing thereon, may also communicate with each other via router 708. Alternatively, separate communication paths may be employed. In some embodiments, data center 720 may be configured to communicate with additional data centers, such that the computing nodes and processes executing thereon may communicate with computing nodes and processes operating within other data centers.

Computing node 710a is depicted as residing on physical hardware comprising one or more processors 716, one or more memories 718 and one or more storage devices 714. Processes on computing node 710a may execute in conjunction with an operating system or alternatively may execute as a bare-metal process that directly interacts with physical resources, such as processors 716, memories 718 or storage devices 714.

Computing nodes 710b and 710c are depicted as operating on virtual machine host 712, which may provide shared access to various physical resources such as physical processors, memory and storage devices. Any number of virtualization mechanisms might be employed to host the computing nodes.

The various computing nodes depicted in FIG. 7 may be configured to host web services, database management systems, business objects, monitoring and diagnostic facilities and so forth. A computing node may refer to various types of computing resources, such as personal computers, servers, clustered computing devices and so forth. A computing node may, for example, refer to various computing devices, such as cell phones, smartphones, tablets, embedded device and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices and so forth. Computing nodes also encompass virtualized computing resources, such as virtual machines implemented with or without a hypervisor, virtualized bare-metal environments and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 8:
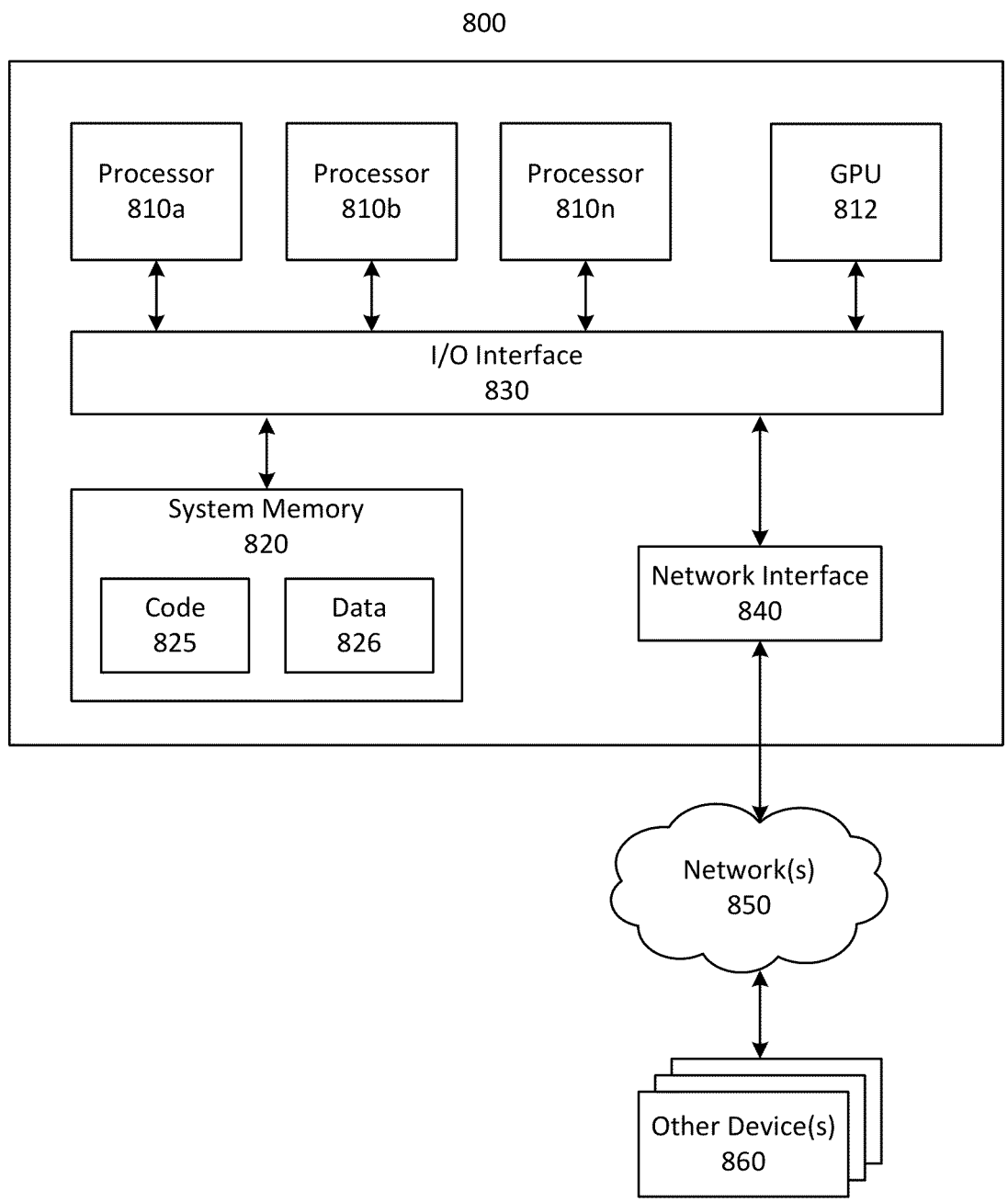
FIG. 8 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 8 depicts a general-purpose computer system that includes or is configured to access one or more computer-accessible media. In the illustrated embodiment, computing device 800 includes one or more processors 810*a*, 810*b* and/or 810*n* (which may be referred herein singularly as a processor 810 or in the plural as the processors 810) coupled to a system memory 820 via an input/output (I/O) interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC or MIPS ISAs or any other suitable ISA. In multiprocessor systems, each of processors 810 may commonly, but not necessarily, implement the same ISA.

In some embodiments, a graphics processing unit ("GPU") 812 may participate in providing graphics rendering and/or physics processing capabilities. A GPU may, for example, comprise a highly parallelized processor architecture specialized for graphical computations. In some embodiments, processors 810 and GPU 812 may be implemented as one or more of the same type of device.

System memory 820 may be configured to store instructions and data accessible by processor(s) 810. In various embodiments, system memory 820 may be implemented using any suitable memory technology, such as static random access memory ("SRAM"), synchronous dynamic RAM ("SDRAM"), nonvolatile/Flash®-type memory or any other type of memory. In the illustrated embodiment, program instructions and data implementing one or more desired functions, such as those methods, techniques and data described above, are shown stored within system memory 820 as code 825 and data 826.

In one embodiment, I/O interface 830 may be configured to coordinate I/O traffic between processor 810, system memory 820 and any peripherals in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computing device 800 and other device or devices 860 attached to a network or networks 850, such as other computer systems or devices, for example. In various embodiments, network interface 840 may support communication via any suitable wired or wireless general data networks, such as types of Ethernet networks, for example. Additionally, network interface 840 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 820 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 800 as system memory 820 or another type of memory. Further, a computer-accessible medium may include transmission media or signals, such as electrical, electromagnetic or digital signals, conveyed via a communication medium, such as a network and/or a wireless link, such as those that may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages, such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
   one or more storage devices having stored thereon a plurality of documents, each document associated with one or more of a plurality of labels;
   one or more computing devices; and
   one or more memories having stored thereon computer readable instructions that, upon execution by the one or more computing devices, cause the system at least to:
      identify a first subset of labels associated with a first subset of a plurality of subsets of the plurality of documents, wherein labels are selected for inclusion in the first subset of labels based at least in part on a frequency of labels in the first subset being associated as a group with documents in the plurality of documents, and wherein the first subset of labels includes two or more of the plurality of labels;
      form a first encoding of the plurality of documents, the first encoding comprising information indicative of the first subset of the plurality of documents being approximately associated with the first subset of labels, wherein being approximately associated with the first subset of labels comprises being associated with at least one label in the first subset of labels;
      form a second encoding of the plurality of documents, the second encoding comprising information indicative of a differential between the first subset of labels and one or more labels associated with a first document of the plurality of documents, wherein the information indicative of the differential includes information that indicates the first document is not associated with one or more labels of the first subset of labels;
      store the second encoding;
      in response to a request to locate documents having labels corresponding to the one or more labels associated with the first document, identify the first subset of the plurality of documents, based at least in part on the first encoding; and
      identify the first document, based at least in part on the stored second encoding and the identified first subset of the plurality of documents.

2. The system of claim 1, wherein the first subset of labels corresponds to a topic.

3. The system of claim 1, wherein the first encoding comprises a matrix, the matrix comprising a document dimension and a topic dimension.

4. The system of claim 1, further comprising one or more memories having stored thereon computer readable instructions that, upon execution by the one or more computing devices, cause the system at least to:
   identify the first document of the first subset of the plurality of documents based at least in part on excluding documents in the first subset of the plurality of documents based at least in part on the second encoding.

5. The system of claim 1, further comprising one or more memories having stored thereon computer readable instructions that, upon execution by the one or more computing devices, cause the system at least to:
  form a third encoding indicative of an association between a topic and the first subset of labels; and
  identify the first document based on the first encoding, the second encoding, and the third encoding.

6. A computer-implemented method comprising:
  identifying, by a computing node, a first subset of labels associated with a first subset of a plurality of subsets of a plurality of documents maintained on one or more storage devices, wherein labels are selected for inclusion in the first subset of labels based at least in part on a frequency of labels in the first subset of labels being associated with documents in the plurality of documents;
  forming, by the computing node, a first encoding of the plurality of documents, the first encoding comprising information indicative of the first subset of the plurality of documents being associated with at least one label in the first subset of labels;
  forming, by the computing node, a second encoding of the plurality of documents, the second encoding comprising information indicative of a differential between the first subset of labels and one or more labels associated with a first document of the plurality of documents, wherein the information indicative of the differential includes information that indicates the first document is not associated with one or more labels of the first subset of labels;
  storing the second encoding;
  in response to a request to locate documents having labels corresponding to the one or more labels associated with the first document, identifying, by the computing node, the first subset of the plurality of documents, based at least in part on the first encoding; and
  identifying, by the computing node, the first document, based at least in part on the stored second encoding and the identified first subset of the plurality of documents.

7. The computer-implemented method of claim 6, wherein the first subset of labels corresponds to a topic.

8. The computer-implemented method of claim 6, wherein the first encoding comprises a matrix, the matrix comprising a document dimension and a topic dimension.

9. The computer-implemented method of claim 8, wherein an entry in the matrix corresponds to the first document.

10. The computer-implemented method of claim 6, further comprising:
  identifying the first document of the first subset of the plurality of documents based at least in part on excluding documents in the first subset of the plurality of documents based at least in part on the second encoding.

11. The computer-implemented method of claim 6, further comprising:
  forming a third encoding comprising a matrix indicative of an association between a topic and the first subset of labels; and
  identifying the first document based at least in part on a product of the first encoding, the second encoding, and the third encoding.

12. The computer-implemented method of claim 6, further comprising:
  determining a set of labels associated with the first document based at least in part on subtracting the differential from a portion of the first encoding corresponding to the first document.

13. The computer-implemented method of claim 6, wherein identifying the first subset of labels comprises minimizing the differential between the first subset of labels and labels associated with the first document.

14. A non-transitory computer-readable storage medium comprising instructions that, in response to execution by one or more computing devices, cause the one or more computing devices at least to:
  identify a first subset of labels associated with a first subset of a plurality of subsets of a plurality of documents, the first subset of labels based at least in part on a frequency of association between labels in the first subset and documents in the plurality of documents;
  form a first encoding of the plurality of documents, the first encoding comprising information indicative of the first subset of the plurality of documents being associated with at least one label of the first subset of labels;
  form a second encoding of the plurality of documents, the second encoding comprising information indicative of a differential between the first subset of labels and one or more labels associated with a first document of the plurality of documents, wherein the information indicative of the differential includes information that indicates the first document is not associated with one or more labels of the first subset of labels;
  store the second encoding;
  in response to a request to locate documents having labels corresponding to the one or more labels associated with the first document, identify the first subset of the plurality of documents, based at least in part on the first encoding; and
  identify the first document, based at least in part on the stored second encoding and the identified first subset of the plurality of documents.

15. The non-transitory computer-readable storage medium of claim 14, wherein the first subset of labels corresponds to a topic.

16. The non-transitory computer-readable storage medium of claim 14, wherein the first encoding comprises a matrix, the matrix comprising a document dimension and a topic dimension.

17. The non-transitory computer-readable storage medium of claim 14, comprising further instructions that, in response to execution by the one or more computing devices, cause the one or more computing devices to at least:
  identify the first document of the first subset of the plurality of documents based at least in part on excluding documents in the first subset of the plurality of documents based at least in part on the second encoding.

18. The non-transitory computer-readable storage medium of claim 14, comprising further instructions that, in response to execution by the one or more computing devices, cause the one or more computing devices to at least:
  form a third encoding comprising a matrix with at least a topic dimension and a label dimension, the matrix indicative of an association between a topic and the first subset of labels; and
  apply the second encoding to a product of the first encoding and the third encoding.

19. The non-transitory computer-readable storage medium of claim 14, comprising further instructions that, in response to execution by the one or more computing devices, cause the one or more computing devices to at least:
  exclude a label from the first subset of labels based at least in part on a frequency of the label with respect to being above a threshold value.

20. The non-transitory computer-readable storage medium of claim 14, comprising further instructions that, in response to execution by the one or more computing devices, cause the one or more computing devices to at least:
    determine a set of labels associated with the first document based at least in part on subtracting the differential from a portion of the first encoding corresponding to the first document.

\* \* \* \* \*